United States Patent
Minor

(10) Patent No.: US 6,809,901 B2
(45) Date of Patent: Oct. 26, 2004

(54) LOW MOMENT MATERIAL FOR MAGNETIC RECORDING HEAD WRITE POLE

(75) Inventor: Michael K. Minor, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 91 days.

(21) Appl. No.: 10/136,973

(22) Filed: May 2, 2002

(65) Prior Publication Data

US 2003/0128464 A1 Jul. 10, 2003

Related U.S. Application Data

(60) Provisional application No. 60/346,678, filed on Jan. 8, 2002.

(51) Int. Cl.[7] ................................. G11B 5/31
(52) U.S. Cl. ...................................... 360/126
(58) Field of Search ................ 360/126, 120, 360/125

(56) References Cited

U.S. PATENT DOCUMENTS

| | | | |
|---|---|---|---|
| 4,541,026 A | | 9/1985 | Bonin et al. |
| 4,639,810 A | | 1/1987 | Sakai |
| 4,646,184 A | * | 2/1987 | Goto et al. ............... 360/120 |
| 5,012,375 A | * | 4/1991 | Nishimura ............... 360/126 |
| 5,132,859 A | * | 7/1992 | Andricacos et al. ........ 360/126 |
| 5,224,002 A | * | 6/1993 | Nakashima et al. ........ 360/126 |
| 5,439,754 A | | 8/1995 | Iwasaki et al. |
| 5,606,478 A | | 2/1997 | Chen et al. |
| 5,668,689 A | | 9/1997 | Schultz et al. |
| 5,777,828 A | | 7/1998 | Kameyama et al. |
| 5,812,350 A | | 9/1998 | Chen et al. |
| 5,864,450 A | | 1/1999 | Chen et al. |
| 5,926,350 A | * | 7/1999 | Chiu et al. ............... 360/126 |
| 6,033,792 A | | 3/2000 | Kirino et al. |
| 6,034,847 A | * | 3/2000 | Komuro et al. ........... 360/126 |
| 6,063,512 A | | 5/2000 | Osaka et al. |
| 6,317,290 B1 | | 11/2001 | Wang et al. |
| 6,687,082 B1 | * | 2/2004 | Ishiwata et al. ........... 360/126 |
| 2002/0131203 A1 | * | 9/2002 | Litvinov et al. ........... 360/125 |
| 2003/0016470 A1 | * | 1/2003 | Minor et al. ............. 360/125 |
| 2003/0076627 A1 | * | 4/2003 | Minor et al. ............. 360/125 |

FOREIGN PATENT DOCUMENTS

| | | | |
|---|---|---|---|
| DE | 3544851 A1 | | 6/1987 |
| DE | 3544883 A1 | | 6/1987 |
| EP | 0472031 A2 | | 2/1992 |
| JP | 58-150120 | * | 9/1983 |
| JP | 60-050607 | * | 3/1985 |
| JP | 60-143412 | * | 7/1985 |
| JP | 62-067710 | * | 3/1987 |
| JP | 62-209707 | * | 9/1987 |
| JP | 02-029904 | * | 1/1990 |
| WO | WO 01/22407 A1 | | 3/2001 |

* cited by examiner

Primary Examiner—Craig A. Renner
(74) Attorney, Agent, or Firm—Robert P. Lenart, Esq.; Pietragallo, Bosick & Gordon

(57) ABSTRACT

A write pole for a magnetic recording head, such as a perpendicular magnetic recording head, includes a first layer of material adjacent a second layer of material. In one embodiment, the first layer of material has a saturation magnetic moment less than about 1.0 T and the second layer of material has a saturation magnetic moment greater than the saturation magnetic moment of the first layer of material. The first layer of material may include $(NiFe)_{100-y}X_y$, wherein X comprises Cr, Cu and/or Ti and wherein y is in the range of about 2 to about 50.

26 Claims, 5 Drawing Sheets

LOW MOMENT MATERIAL FOR MAGNETIC RECORDING HEAD WRITE POLE

CROSS REFERENCE TO RELATED APPLICATION

This application claims the benefit of U.S. Provisional Application No. 60/346,678 filed Jan. 8, 2002.

FIELD OF THE INVENTION

The invention relates to magnetic recording heads, and more particularly, to a low moment material for forming a hybrid write pole of a perpendicular magnetic recording head.

BACKGROUND OF THE INVENTION

Magnetic recording heads have utility for use in a magnetic disc drive storage system. Most magnetic recording heads used in such systems today are "longitudinal" magnetic recording heads. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches will likely be necessary to overcome the limitations of longitudinal magnetic recording.

An alternative to longitudinal recording is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between that pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

A magnetic recording system such as, for example, a perpendicular magnetic recording system may utilize a write pole having uniform magnetic properties, i.e. the write pole is formed of a single material having a uniform magnetic moment. However, such a write pole can exhibit skew effects which can degrade adjacent tracks.

Such magnetic recording systems alternatively may utilize a write pole having a "hybrid" design wherein, for example, a high saturation magnetic moment material is formed on top of or adjacent to a low saturation magnetic moment material. This type of design has been found effective in, for example, reducing skew effects during the writing process.

In constructing the hybrid write pole, the high moment material and the low moment material must be coupled, for example by exchange coupling, and together they should satisfy all magnetic requirements of a standard write pole such as, for example, soft and uniaxial magnetic properties and a relatively low hard axis remanence ($M_{rh}$). Specifically, the soft and uniaxial magnetic properties contribute to an efficient writer, while a low $M_{rh}$ reduces or eliminates writing when the head is not energized.

For the write pole design, most of the focus has been on developing high moment materials having suitable properties, such as a relatively large saturation magnetization (4 $\pi$ Ms), a low coercivity and a generally well defined uniaxial anisotropy. These factors are important for the write pole and in particular for a perpendicular magnetic recording head which utilizes a deep gap field to perform a write operation as opposed to a fringing field utilized by a longitudinal magnetic recording head. However, with the development of the hybrid pole design, there is an increased focus on low moment materials which have a unique property set and characteristics as well. For example, the low moment material should have magnetically soft and uniaxial properties for head efficiency, a relatively low saturation magnetization or moment to reduce or eliminate writing when the head is not energized and a relatively high resistivity to reduce eddy current losses.

Accordingly, there is identified a need for an improved magnetic recording head that overcomes limitations, disadvantages, and/or shortcomings of known magnetic recording heads. In addition, there is identified a need for improved low saturation magnetization or low moment materials for use in forming a write pole, and particularly a hybrid main write pole, of a perpendicular magnetic recording head that overcomes limitations, disadvantages, and/or shortcomings of known write poles.

SUMMARY OF THE INVENTION

Embodiments of the invention meet the identified needs, as well as other needs, as will be more fully understood following a review of the specification and drawings.

In accordance with an aspect of the invention, a main write pole for a perpendicular magnetic recording head comprises a first layer of material having a saturation magnetic moment less than about 1.0 T and a second layer of material adjacent the first layer and having a saturation magnetic moment greater than the saturation magnetic moment of the first layer of material. The first layer of material may be formed of NiFe alloys. More specifically, the first layer of material may be formed of NiFeX, wherein X comprises Cr, Cu, and/or Ti. More specifically, the first layer of material may be formed of (NiFe)$_{100-y}$X$_y$, wherein X comprises Cr, Cu and/or Ti and wherein y is in the range of about 2 to about 50.

In accordance with an additional aspect of the invention, a main write pole for a perpendicular magnetic recording head comprises a first layer of material having a first saturation magnetic moment and a second layer of material adjacent the first layer and having a second saturation magnetic moment that is greater than the first saturation magnetic moment. The first layer of material may include (NiFe)$_{100-y}$X$_y$, wherein X comprises Cr, Cu and/or Ti and wherein y is in the range of about 2 to about 50.

In accordance with another aspect of the invention, a magnetic disc drive storage system comprises a magnetic recording medium and a magnetic recording head positioned adjacent the magnetic recording medium. The magnetic recording head includes a write pole which comprises a first layer of material having a saturation magnetic moment less than about 0.5 T and a second layer of material adjacent the first layer and having a saturation magnetic moment greater than the saturation magnetic moment of the first layer of material.

DETAILED DESCRIPTION OF THE INVENTION

The invention provides a magnetic recording head, and more particularly a low moment material for a hybrid main write pole of a perpendicular magnetic recording head. The invention is particularly suitable for use with a magnetic disc drive storage system. A recording head, as used herein, is generally defined as a head capable of performing read and/or write operations. Perpendicular magnetic recording, as used herein, generally refers to orienting magnetic domains within a magnetic storage medium substantially perpendicular to the direction of travel of the recording head and/or recording medium.

Figure 1:
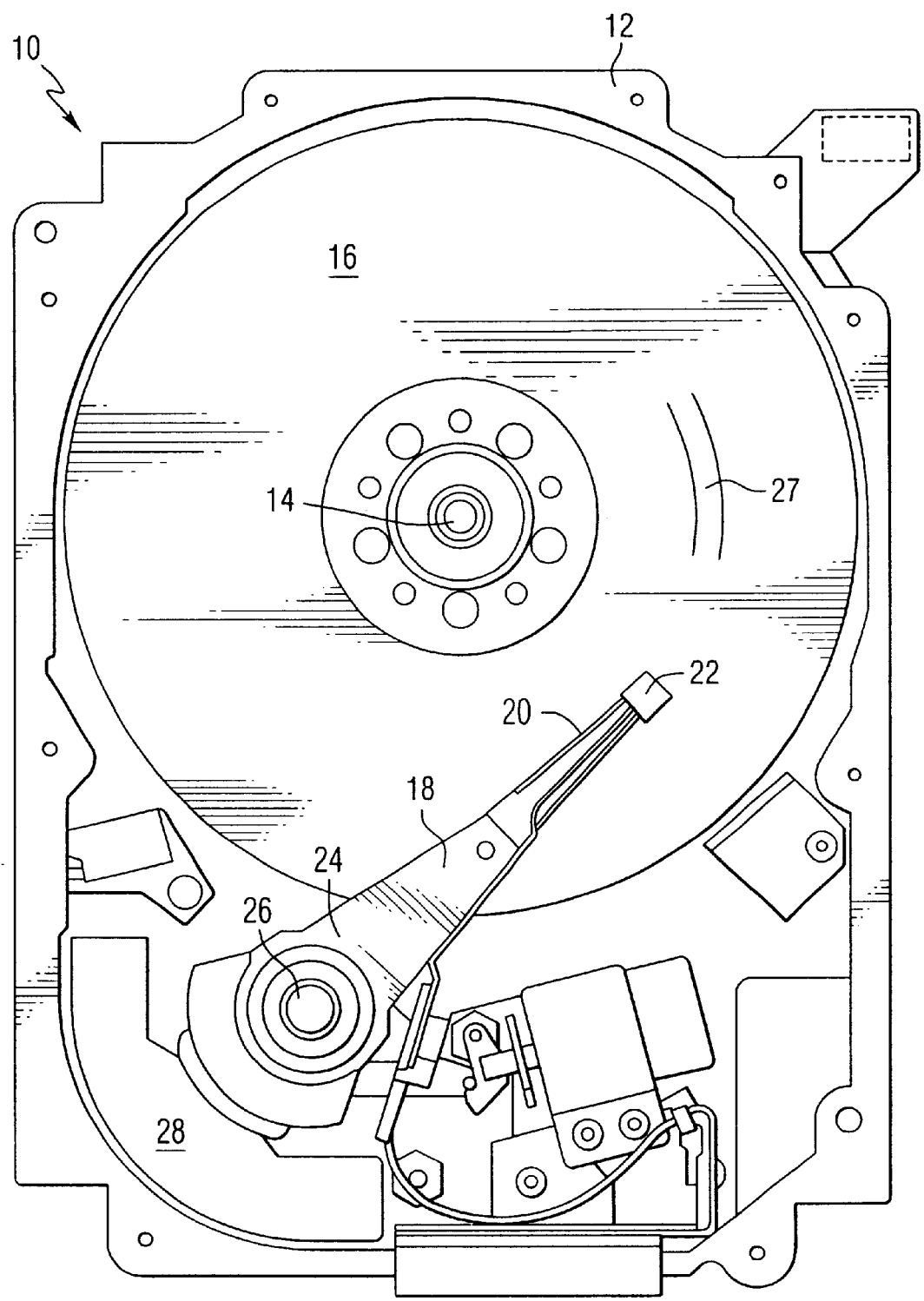
FIG. 1 is a pictorial representation of a disc drive system that may utilize a magnetic recording head in accordance with the invention.

FIG. 1 is a pictorial representation of a disc drive 10 that can utilize a perpendicular magnetic recording head in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
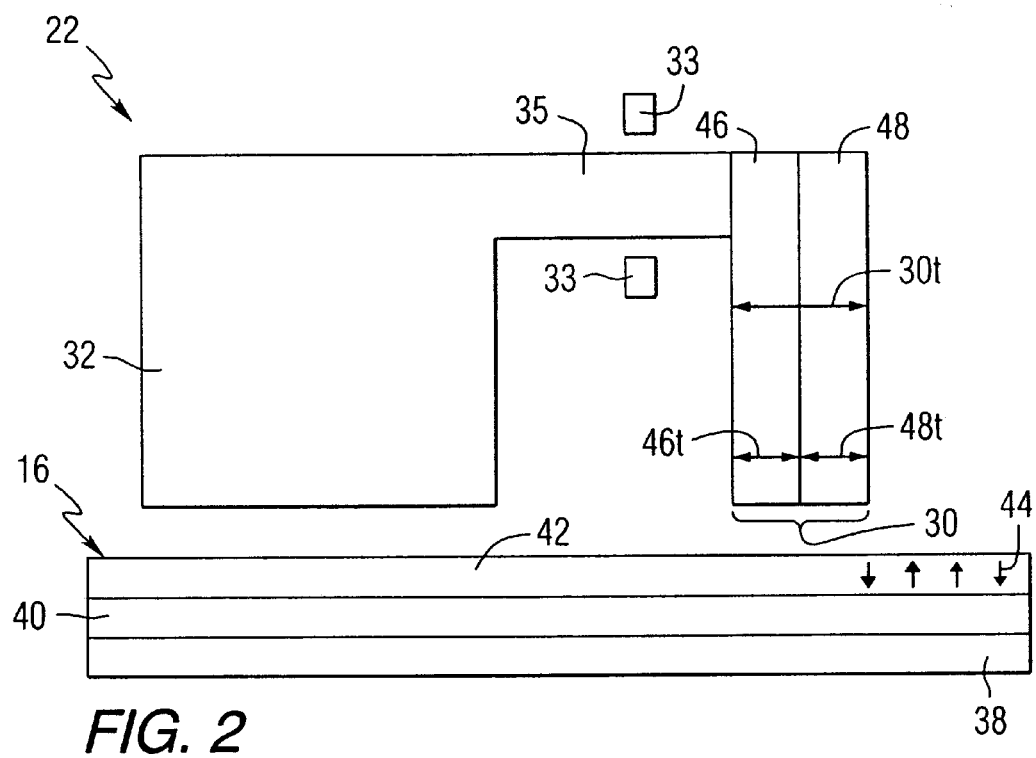
FIG. 2 is a partially schematic side view of a magnetic recording head and a magnetic recording medium in accordance with the invention.

FIG. 2 is a partially schematic side view of a perpendicular magnetic recording head 22 and a perpendicular magnetic recording medium 16. Although a preferred embodiment of the invention is described herein with reference to a perpendicular magnetic recording head, it will be appreciated that aspects of the invention may also be used in conjunction with other type recording heads where it may be desirable to employ low moment materials. Specifically, the recording head 22 may include a writer section comprising a main write pole 30 and a return or opposing pole 32 that are magnetically coupled by a yoke or pedestal 35. A magnetizing coil 33 surrounds the yoke or pedestal 35 for energizing the recording head 22. The recording head 22 also may include a read head, not shown, which may be any conventional type read head as is generally known in the art.

Still referring to FIG. 2, the perpendicular magnetic recording medium 16 is positioned adjacent to or under the recording head 22. The recording medium 16 includes a substrate 38, which may be made of any suitable material such as ceramic glass or amorphous glass. A soft magnetic underlayer 40 is deposited on the substrate 38. The soft magnetic underlayer 40 may be made of any suitable material having, for example, a relatively high moment and high permeability. A hard magnetic recording layer 42 is deposited on the soft underlayer 40, with the perpendicular oriented magnetic domains 44 contained in the hard layer 42. Suitable hard magnetic materials for the hard magnetic recording layer 42 may include at least one material selected from CoCr, FePd, CoPd, CoFePd, CoCrPd, or CoCrPt.

In accordance with the invention, the main write pole 30 is a hybrid-type write pole structure. Specifically, the main write pole 30 includes a first layer 46 and a second layer 48. The second layer 48 may be formed directly adjacent to, in contact with, or on top of the first layer 46. The main write pole 30 may have a thickness 30 t in the range of about 500 angstroms (Å) to about 5000 Å. The first layer of material 46 may have a thickness 46 t in the range of about 250 Å to about 2500 Å. The second layer of material 48 may have a thickness 48 t in the range of about 250 Å to about 2500 Å.

Referring to FIG. 2, the first layer 46 is a relatively low saturation magnetic moment material that provides the necessary flux efficiency to conduct the magnetic flux to the second layer 48. The second layer 48 is a relatively high saturation magnetic moment material that acts as the magnetic flux or magnetic field concentrating portion of the main write pole 30 that provides a strong magnetic write field which permits use of a magnetic storage medium having a relatively high anisotropy, thereby limiting or minimizing superparamagnetic instabilities at high recording densities.

The first layer 46 is formed of a material, as will be discussed in detail herein, having a saturation magnetic moment that is less than about 1.0 Tesla (T). In one embodiment, for example, the first layer 46 has a saturation magnetic moment that is less than about 0.5 T. The first layer 46 may be generally referred to herein as a "low moment material" having a saturation magnetic moment within the ranges set forth herein. The second layer 48 is formed of a material having a saturation magnetic moment that is greater than the saturation magnetic moment of the first layer 46. The second layer 48 has a saturation magnetic moment that is greater than about 1.0 T. In one embodiment, for example, the second layer 48 has a saturation magnetic moment that is greater than about 1.6 T. The second layer 48 may be generally referred to herein as a "high moment material" having a saturation magnetic moment within the ranges set forth herein.

To illustrate the invention, reference is made to FIGS. 3–9. Specifically, the low moment material first layer 46 is illustrated by forming films with the following structures:

Si\SiO$_2$\2000 Å (Ni$_{80}$Fe$_{20}$)$_{100-y}$Cu$_y$ where y=0, 10, 20, 30, 35, and 40

Si\SiO$_2$\2000 Å (Ni$_{80}$Fe$_{20}$)$_{100-y}$Cr$_y$ where y=0, 10, 15, 20, 25, and 30

Si\SiO$_2$\2000 Å (Ni$_{80}$Fe$_{20}$)$_{100-y}$Ti$_y$ where y=0, 4, 6, 9, 12, and 15

The films corresponding to the first layer 46 are NiFe alloys or other materials and/or alloys having similar properties and/or qualities and, more specifically, NiFeX or other materials and/or alloys having similar properties and/or qualities wherein X=Cu, Cr, or Ti. It will be appreciated that X is not limited to these particular elements and may include combinations of these elements or other elements having similar properties and/or qualities. The elements Cu, Cr, and Ti are used merely to demonstrate the concept of low moment materials for forming the first layer 46 of the write pole 30. The NiFe alloy may have a ratio, for example, Ni:Fe of 4:1 with the ratio varying about plus or minus 10 percent.

The NiFeX films set forth herein were formed via co-deposition physical vapor deposition from pure Ni, Fe, Cu, Cr, and Ti targets. Si(100) with 3000 Å of thermal oxide were used as substrates. The depositions were performed at ambient temperature using ultra high purity argon as the processing gas. The composition was adjusted by controlling the flux from each of the targets.

Figure 3:
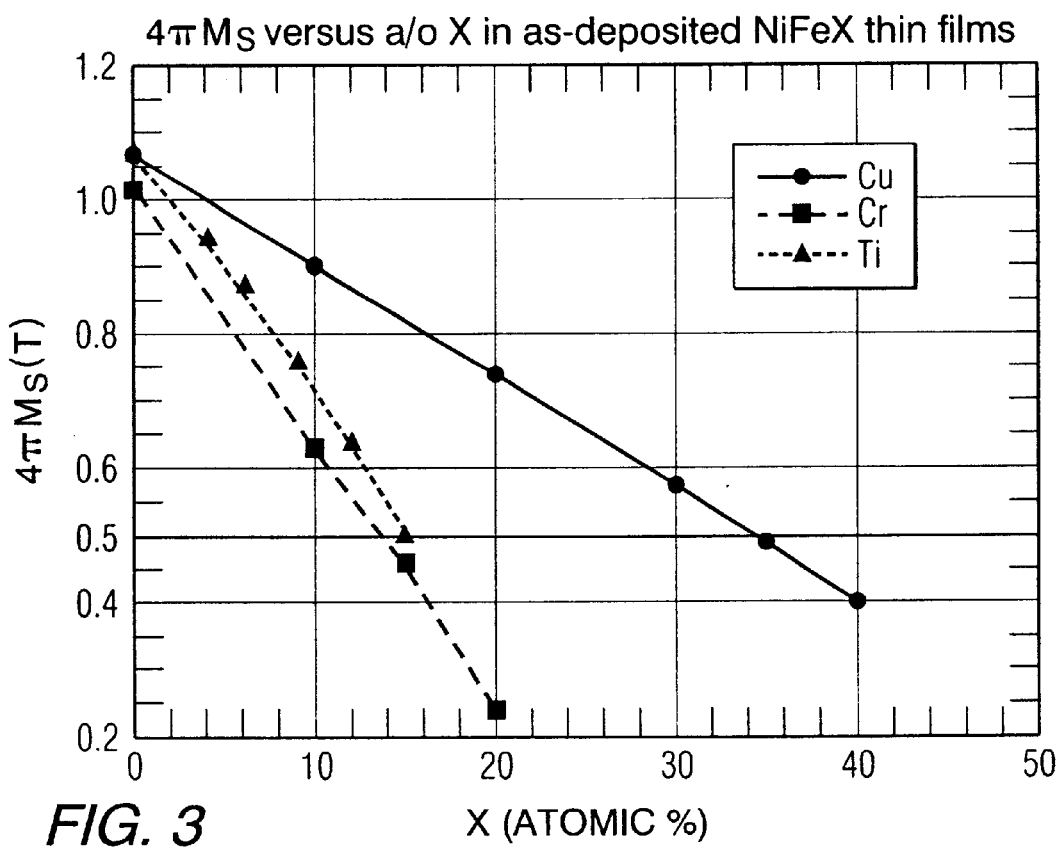
FIG. 3 illustrates magnetic saturation moment, $4\pi M_s$, versus atomic percent of X for NiFeX films constructed in accordance with the invention.

Specifically, FIG. 3 illustrates the moment of the NiFeX films versus the atomic percent of X added thereto. While the amount of X was varied, the NiFe ratio was kept constant. As illustrated, the moment of the NiFeX decreases, in a substantially linear manner, with increasing amounts of X such that the moment is less than about 1.0 T. To achieve the moment of, for example, less than about 1.0 T or in one embodiment of less than about 0.5 T, the atomic percent amount of X is in the range of about 2 to about 50 atomic percent. More specifically, to achieve a moment of less than about 0.5 T, FIG. 3 illustrates that about 34 atomic percent of Cu is required, about 13 atomic percent of Cr is required, and about 15 atomic percent of Ti is required. This would correspond to the alloys Ni$_{52.8}$Fe$_{13.2}$Cu$_{34}$, Ni$_{69.6}$Fe$_{17.4}$Cr$_{13}$, and Ni$_{68}$Fe$_{17}$Ti$_{15}$.

Accordingly, FIG. 3 illustrates that a low moment material having, for example, a moment less than about 1.0 T, or in one embodiment less than about 0.5 T, may be achieved for forming the first layer 46 of the write pole 30. The sufficiently low moment minimizes the potential of the first layer 46 writing on the media.

Figure 4:
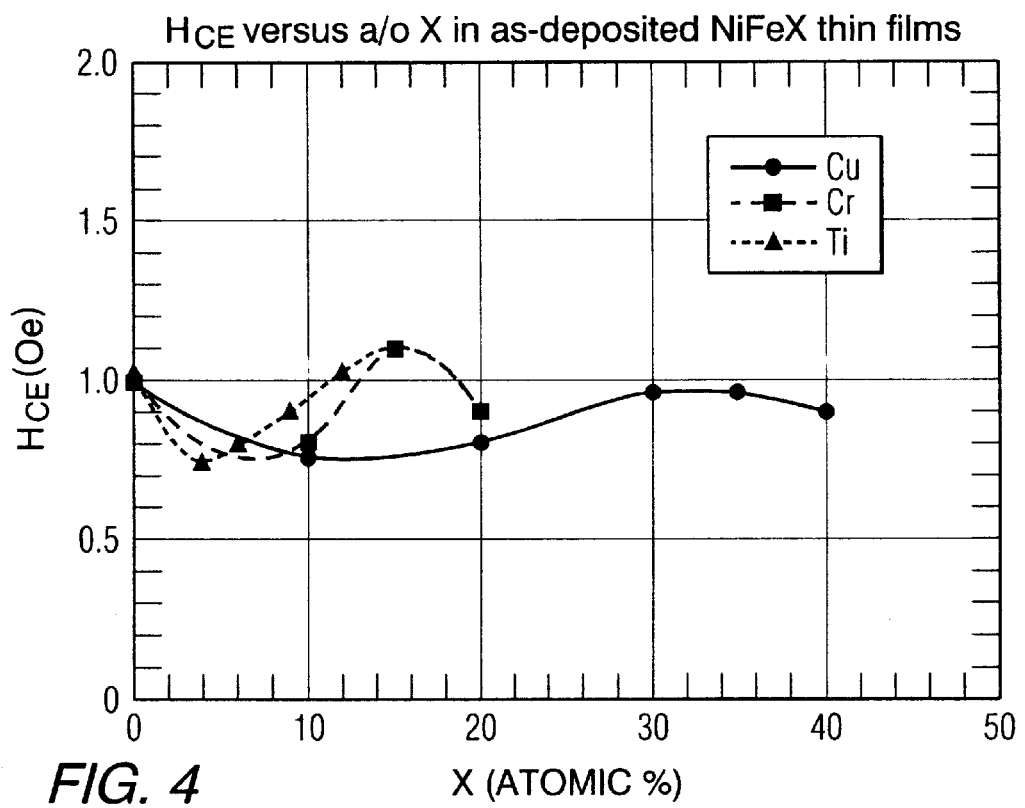
FIG. 4 illustrates easy axis coercivity versus atomic percent of X for the NiFeX films.

FIG. 4 illustrates an easy axis coercivity (H$_{CE}$) versus the amount of X added to the NiFeX to form the films as described herein. As shown, the easy axis coercivity is in the range of about 0.6 Oe to about 1.2 Oe following the addition of Cu, Cr, or Ti. This is a desirable range for the coercivity such that the films maintain suitable magnetic softness characteristics for use in forming the first layer 46 of the write pole 30. In one embodiment, the coercivity is about 1 Oe based on the amount of Cu, Cr, or Ti added to the NiFe films.

Figure 5:
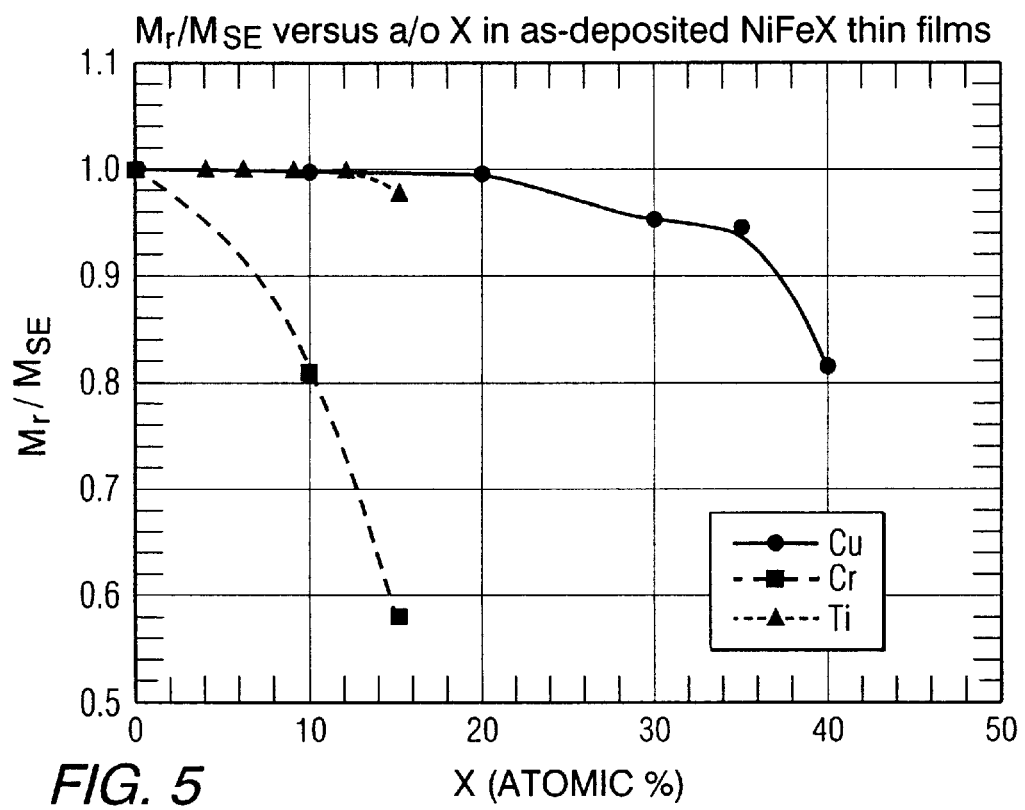
FIG. 5 illustrates squareness versus atomic percent of X for the NiFeX films.

In addition to coercivity, an additional measure of magnetic softness is the easy axis squareness, SQ$_E$, wherein SQ$_E$=M$_r$/M$_{SE}$, where M$_r$=the magnetic remanence of the material along the easy axis and M$_{SE}$=the magnetic saturation along the easy axis of the material. For an ideal, soft magnetic film material, the squareness value is approximately 1.0. FIG. 5 illustrates the squareness of the NiFeX films as a function of the amount of X added thereto. The films with Ti and Cu have squareness values of about 1.0. More specifically, 15 atomic percent of Ti, which as described herein resulted in a material having a moment of about 0.5 T, resulted in a film exhibiting a squareness of about 1.0. Similarly, 34 atomic percent of Cu, which also resulted in a moment of about 0.5 T as described herein, exhibited a squareness value of approximately 0.95. 13 atomic percent of Cr resulted in a squareness value of about 0.7, which still may be acceptable for a film for forming the first layer 46 of the write pole 30 as a result of this particular film having a suitable coercivity and magnetic moment value, as described and illustrated herein.

Figure 6:
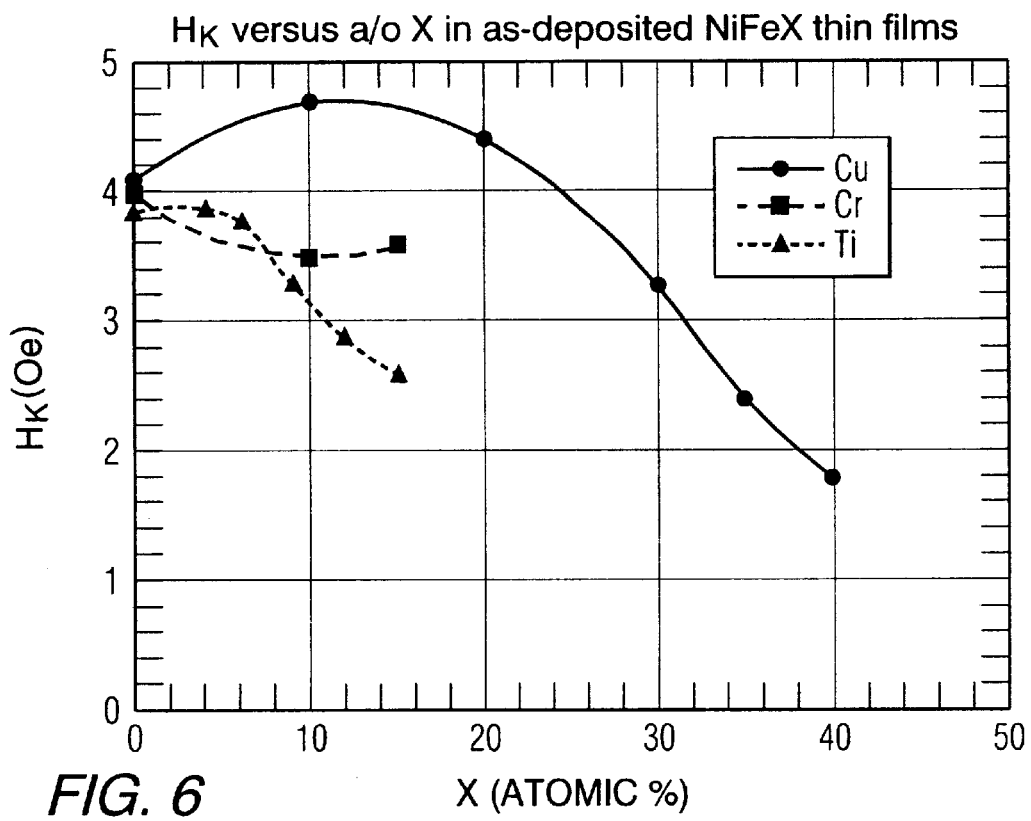
FIG. 6 illustrates $H_k$ versus atomic percent of X for the NiFeX films.

FIG. 6 illustrates H$_k$ (the value of an applied field to reach magnetic saturation along the hard axis) versus the amount of X added to the NiFeX films. H$_k$ is an important indicator of the first layer 46 material having a sufficiently high permeability/efficiency and sufficient uniaxial anisotropy for use in constructing the write pole 30. Specifically, FIG. 6 illustrates that the addition of Cu, Cr, or Ti does have an effect on the H$_k$ value of NiFe. However, the effect is relatively small and for the compositions needed, H$_k$ is less than that of a pure NiFe material.

Figure 7:
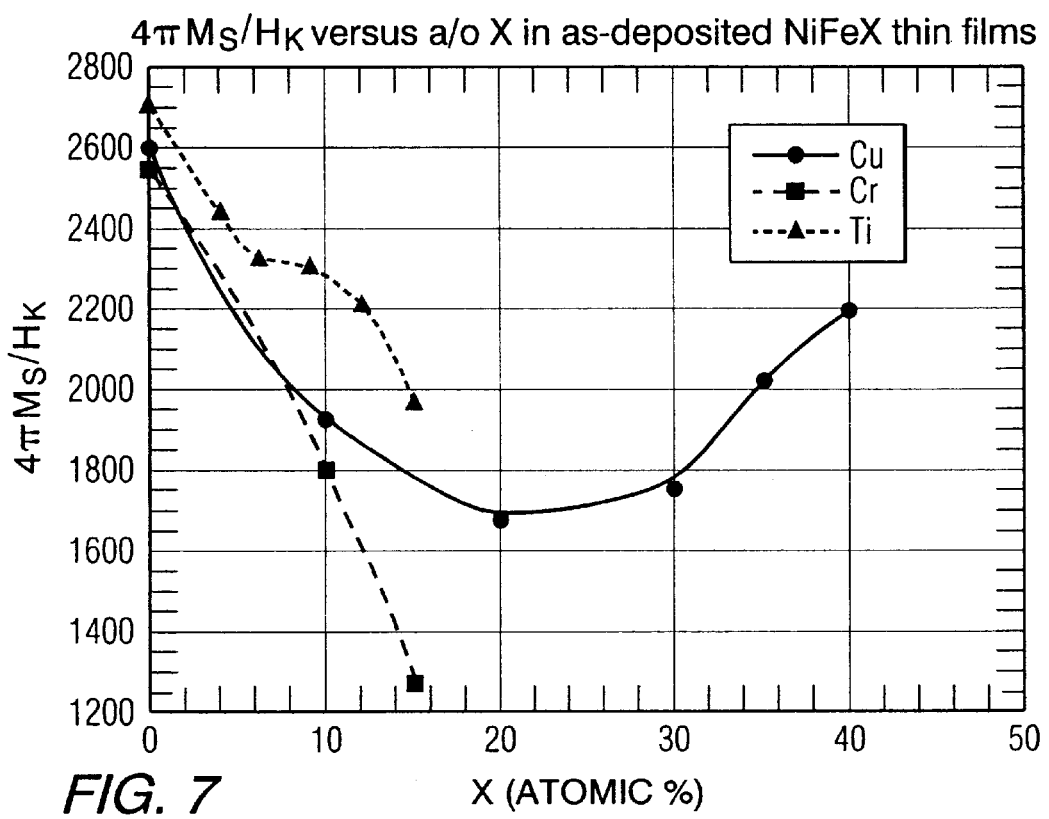
FIG. 7 illustrates ideal permeability versus atomic percent of X for the NiFeX films.

FIG. 7 illustrates ideal permeability, 4πM$_s$/H$_k$, versus the amount of X added to the NiFeX films. The ideal permeability is directly related to H$_k$. FIG. 7 illustrates that the addition of X results in a decrease in the ideal permeability. However, the ideal permeability remains well above 1000, which is sufficient to carry flux through the first layer 46 to the second layer 48 to form an efficient write pole 30.

Figure 8:
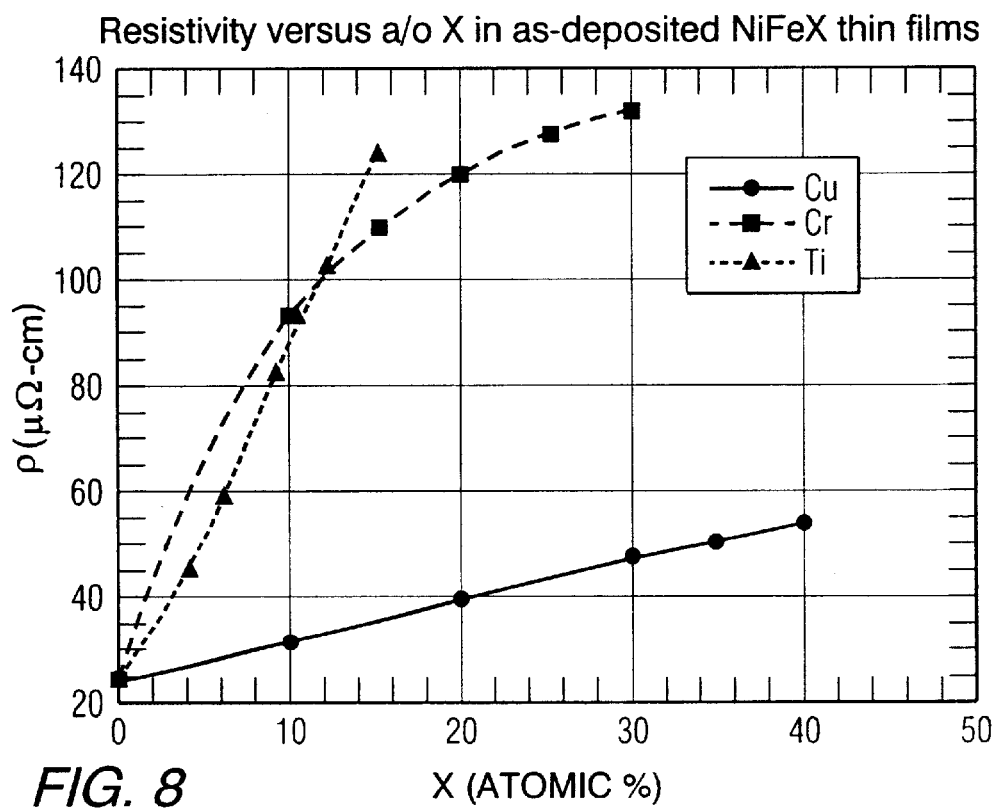
FIG. 8 illustrates resistivity versus atomic percent of X for the NiFeX films.

In addition to the magnetic properties described herein, the resistivity of the first layer 46 is also an important property for consideration. One of the potential problems associated with NiFe is that it has a relatively low resistivity which can result in large eddy current losses and reduced permeability. It is desirable to increase the overall resistivity of the material to prevent the eddy current losses and reduced permeability. FIG. 8 illustrates the resistivity of the NiFeX material used to form the first layer 46 as a function of the amount of X added thereto. Specifically, FIG. 8 illustrates that when Cu, Cr, or Ti is added, the resistivity increases with increasing amounts of X. The resistivity may be, for example, greater than about 20 μΩ-cm. For the NiFeCr and NiFeTi materials having suitable magnetic properties and a magnetic moment of about 0.5 T, a resistivity of greater than about 100 μΩ-cm can be attained. As can be appreciated, this is an overall increase in resistivity of about five times the resistivity of the NiFe without the Cr and Ti added thereto. In addition, for the NiFeCu having suitable magnetic properties and a magnetic moment of about 0.5 T, the resistivity increase is a factor of approximately two times the resistivity of the NiFe without the Cu added thereto.

Figure 9:
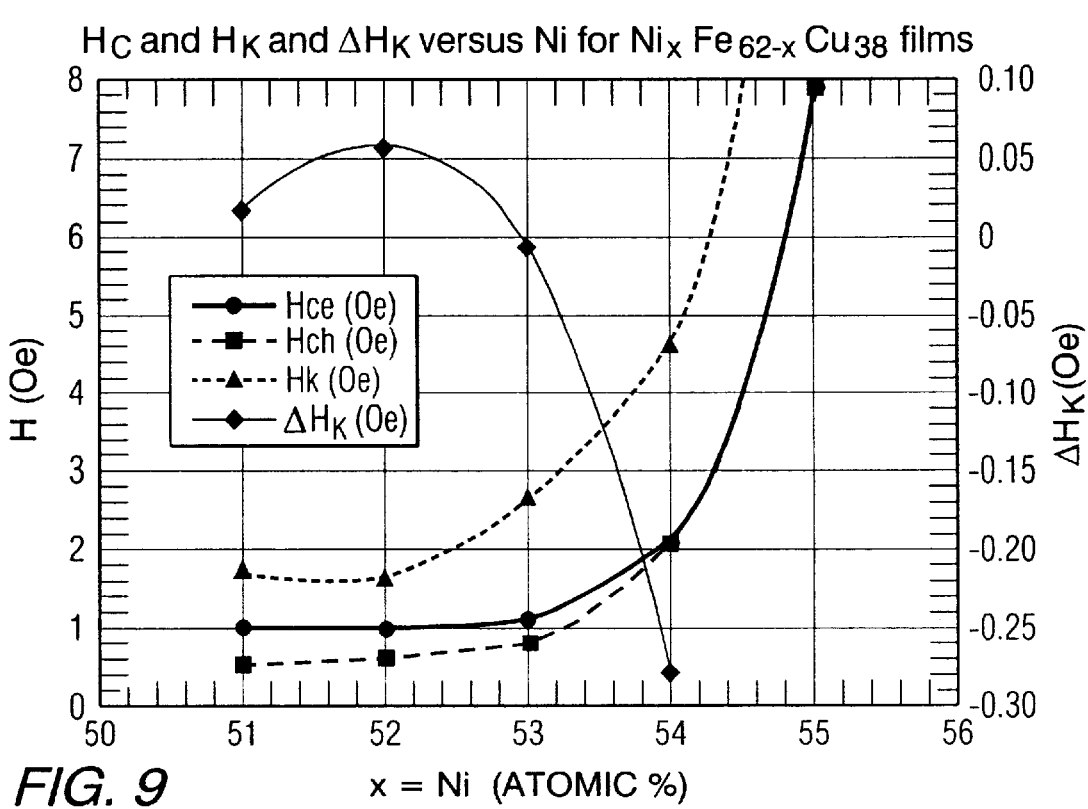
FIG. 9 illustrates various magnetic characteristics versus atomic percent of Ni for $Ni_xFe_{62-x}Cu_{38}$.

An additional factor in constructing a write pole 30 is the magnetostriction of the materials. NiFe has a nearly zero magnetostriction. The addition of an element X changes the electronic structure and hence, the magnetostriction. Once X and its corresponding amount have been determined for the low moment material properties, as described herein, the magnetostriction can be adjusted by slightly varying the NiFe ratio. Specifically, FIG. 9 illustrates the easy axis coercivity (H$_{ce}$), hard axis coercivity (H$_{ch}$), H$_k$ and ΔH$_k$, which is proportional to magnetostriction, versus the atomic percent of Ni in the films Ni$_x$Fe$_{62-x}$Cu$_{38}$. FIG. 9 illustrates that ΔH$_k$ and, hence, magnetostriction can be tailored in the NiFeX by adjusting the Ni:Fe ratio. For example, by adjusting the NiFe ratio, ΔHK can be made to equal zero and hence, magnetostriction can be made zero as well.

It is desirable for the NiFeX material used to form the first layer 46 of the write pole 30 to be thermally stable, which is an important factor for write pole materials. The NiFeX films constructed in accordance with the invention and described herein, were annealed at 300° C. for four hours in a longitudinal field and no appreciable changes in any of the magnetic properties were found.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A main write pole for a perpendicular magnetic recording head comprising:
   a first layer of material having a first saturation magnetic moment and a thickness of less than or equal to about 2500 Å, wherein said first layer of material includes $(NiFe)_{100-y}X_y$, wherein X comprises Cr, Cu and/or Ti and wherein y is in the range of about 2 to about 50; and
   a second layer of material immediately adjacent said first layer and having a second saturation magnetic moment that is greater than said first saturation magnetic moment.

2. The main write pole of claim 1, wherein said first layer of material has a thickness in the range of about 250 Å to about 2500 Å.

3. The main write pole of claim 1, wherein the NiFe is $Ni_{80}Fe_{20}$.

4. The main write pole of claim 1, wherein said first layer of material has a resistivity of greater than about 20 $\mu\Omega$-cm.

5. The main write pole of claim 1, wherein said first layer of material has an easy axis coercivity in the range of about 0.6 Oe to about 1.2 Oe.

6. The main write pole of claim 1, wherein said first layer of material has a saturation magnetic moment of less than about 1.0 T.

7. A magnetic disc drive storage system, comprising:
   a magnetic recording medium; and
   a magnetic recording head positioned adjacent said magnetic recording medium, said magnetic recording head including a write pole, said write pole comprising:
      a first layer of material having a saturation magnetic moment and a thickness of less than or equal to about 2500 Å, wherein said first layer of material includes $(NiFe)_{100-y}X_y$, wherein X comprises Cr, Cu and/or Ti and wherein y is in the range of about 2 to about 50; and
      a second layer of material immediately adjacent said first layer and having a saturation magnetic moment greater than said saturation magnetic moment of said first layer of material.

8. The magnetic disc drive storage system of claim 7, wherein said first layer of material has a thickness in the range of about 250 Å to about 2500 Å.

9. The magnetic disc drive storage system of claim 7, wherein said NiFe is $Ni_{80}Fe_{20}$.

10. The magnetic disc drive storage system of claim 7, wherein said first layer of material has a resistivity of greater than about 20 $\mu\Omega$-cm.

11. The magnetic disc drive storage system of claim 7, wherein said write pole has a thickness in the range of about 500 Å to about 5000 Å.

12. The magnetic disc drive storage system of claim 7, wherein said magnetic recording head is a perpendicular magnetic recording head.

13. The magnetic disc drive storage system of claim 7, wherein said first layer of material has a saturation magnetic moment of less than about 1.0 T.

14. A main write pole for a perpendicular magnetic recording head comprising:
   a first layer of material having a first saturation magnetic moment, wherein said first layer of material includes $(NiFe)_{100-y}X_y$, wherein X comprises Cu and/or Ti and wherein y is in the range of about 2 to about 50; and
   a second layer of material immediately adjacent said first layer and having a second saturation magnetic moment that is greater than said first saturation magnetic moment.

15. The main write pole of claim 14, wherein said first layer of material has a thickness in the range of about 250 Å to about 2500 Å.

16. The main write pole of claim 14, wherein the NiFe is $Ni_{80}Fe_{20}$.

17. The main write pole of claim 14, wherein said first layer of material has a resistivity of greater than about 20 $\mu\Omega$-cm.

18. The main write pole of claim 14, wherein said first layer of material has an easy axis coercivity in the range of about 0.6 Oe to about 1.2 Oe.

19. The main write pole of claim 4, wherein said first layer of material has a saturation magnetic moment of less than about 1.0 T.

20. A magnetic disc drive storage system, comprising:
   a magnetic recording medium; and
   a magnetic recording head positioned adjacent said magnetic recording medium, said magnetic recording head including a write pole, said write pole comprising:
      a first layer of material having a saturation magnetic moment, wherein said first layer of material includes $(NiFe)_{100-y}X_y$, wherein X comprises Cu and/or Ti and wherein y is in the range of about 2 to about 50; and
      a second layer of material immediately adjacent said first layer and having a saturation magnetic moment greater than said saturation magnetic moment of said first layer of material.

21. The magnetic disc drive storage system of claim 20, wherein said first layer of material has a thickness in the range of about 250 Å to about 2500 Å.

22. The magnetic disc drive storage system of claim 20, wherein said NiFe is $Ni_{80}Fe_{20}$.

23. The magnetic disc drive storage system of claim 20, wherein said first layer of material has a resistivity of greater than about 20 $\mu\Omega$-cm.

24. The magnetic disc drive storage system of claim 20, wherein said write pole has a thickness in the range of about 500 Å to about 5000 Å.

25. The magnetic disc drive storage system of claim 20, wherein said magnetic recording head is a perpendicular magnetic recording head.

26. The magnetic disc drive storage system of claim 20, wherein said first layer of material has a saturation magnetic moment of less than about 1.0 T.

* * * * *